May 20, 1930.  E. O. BEARDSLEY ET AL  1,759,217
MOLDING MACHINE
Filed Feb. 19, 1926    9 Sheets-Sheet 4

Inventor-
Elmer O. Beardsley
& Walter F. Piper
By Fred Gerlach
their Atty.

May 20, 1930. E. O. BEARDSLEY ET AL 1,759,217
MOLDING MACHINE
Filed Feb. 19, 1926 9 Sheets-Sheet 5

May 20, 1930.  E. O. BEARDSLEY ET AL  1,759,217
MOLDING MACHINE
Filed Feb. 19, 1926   9 Sheets-Sheet 9

Inventor
Elmer O. Beardsley
& Walter F. Piper
By Fred Gerlach
   Their Atty.

Patented May 20, 1930

1,759,217

UNITED STATES PATENT OFFICE

ELMER O. BEARDSLEY AND WALTER F. PIPER, OF CHICAGO, ILLINOIS, ASSIGNORS TO THE BEARDSLEY & PIPER COMPANY, OF CHICAGO, ILLINOIS, A CORPORATION OF ILLINOIS

MOLDING MACHINE

Application filed February 19, 1926. Serial No. 89,274.

The invention relates to molding machines and more particularly to that type which comprises a portable carriage or truck which is equipped with a reservoir adapted to carry a load or supply of sand which is fed to the molding machine, and which is sufficient to fill a number of flasks.

One object of the present invention is to improve the construction set forth in our application for patent filed July 9, 1921, Serial No. 483,385, now Patent No. 1,681,386, and to render it more efficient and durable.

Another object of the invention is to make provision for repeatedly screening or mixing the sand delivered into the reservoir when it is necessary to cut or temper it.

Another object is to provide for more dependably feeding sand from the reservoir to the molding machine.

Another object of the invention is to provide an improved construction which is adapted to withstand the severe usage to which machines of this character are subjected in practice.

Other objects of the invention will be apparent from a consideration of the following detailed description.

The invention consists in the several novel features hereinafter set forth and more particularly defined by the claims at the conclusion hereof.

Figure 1:
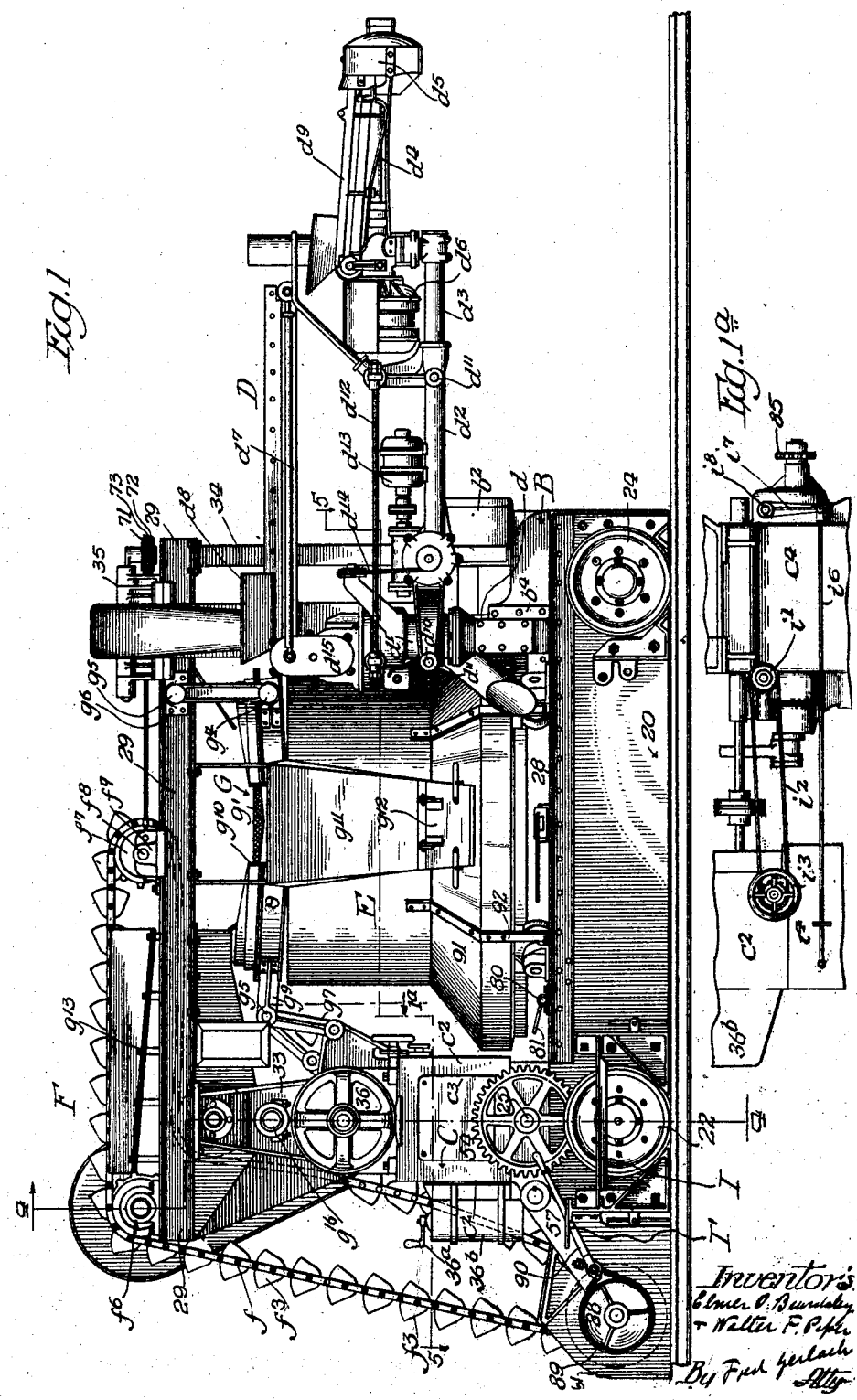
Figure 2:
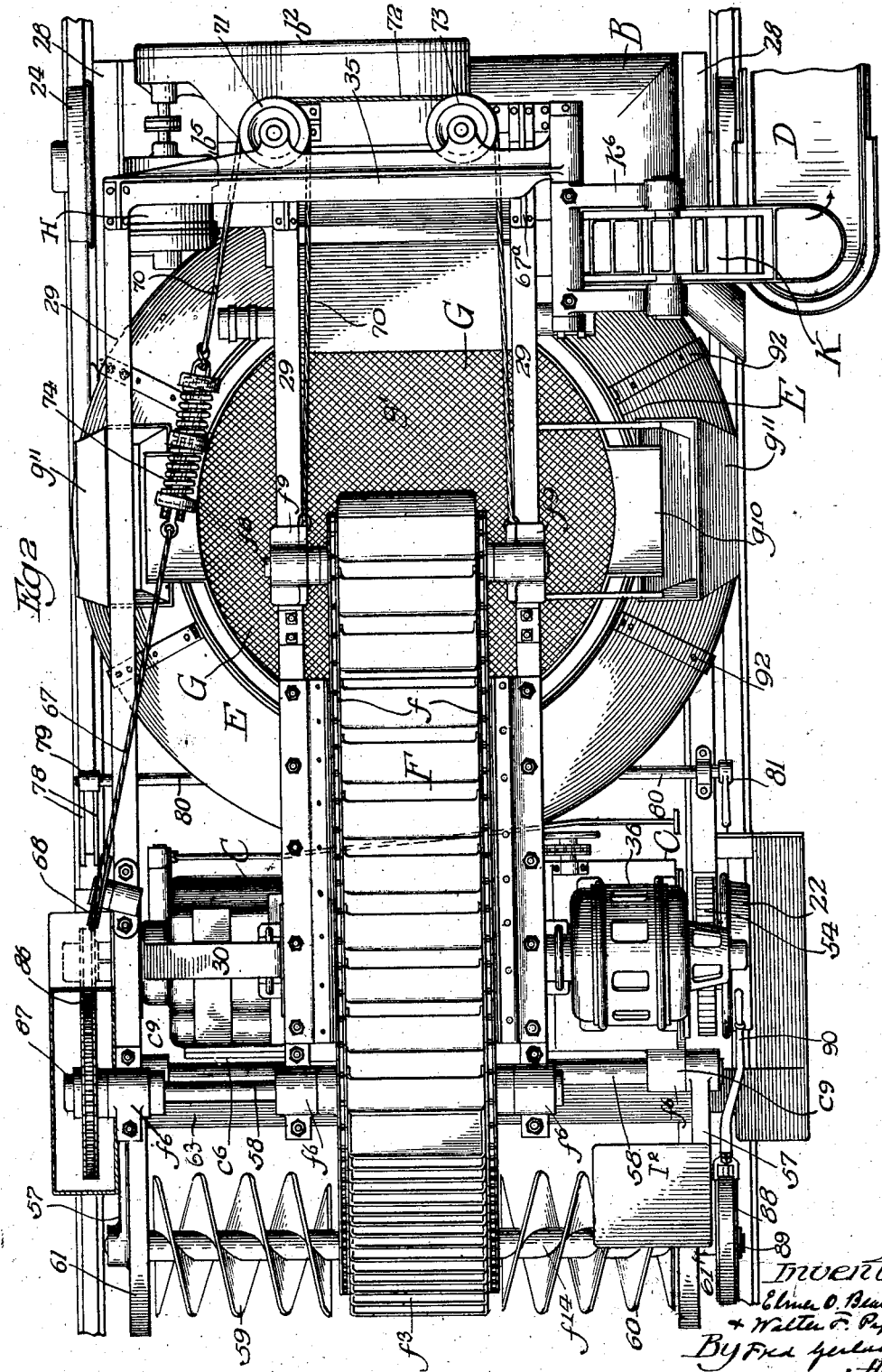
Figure 3:
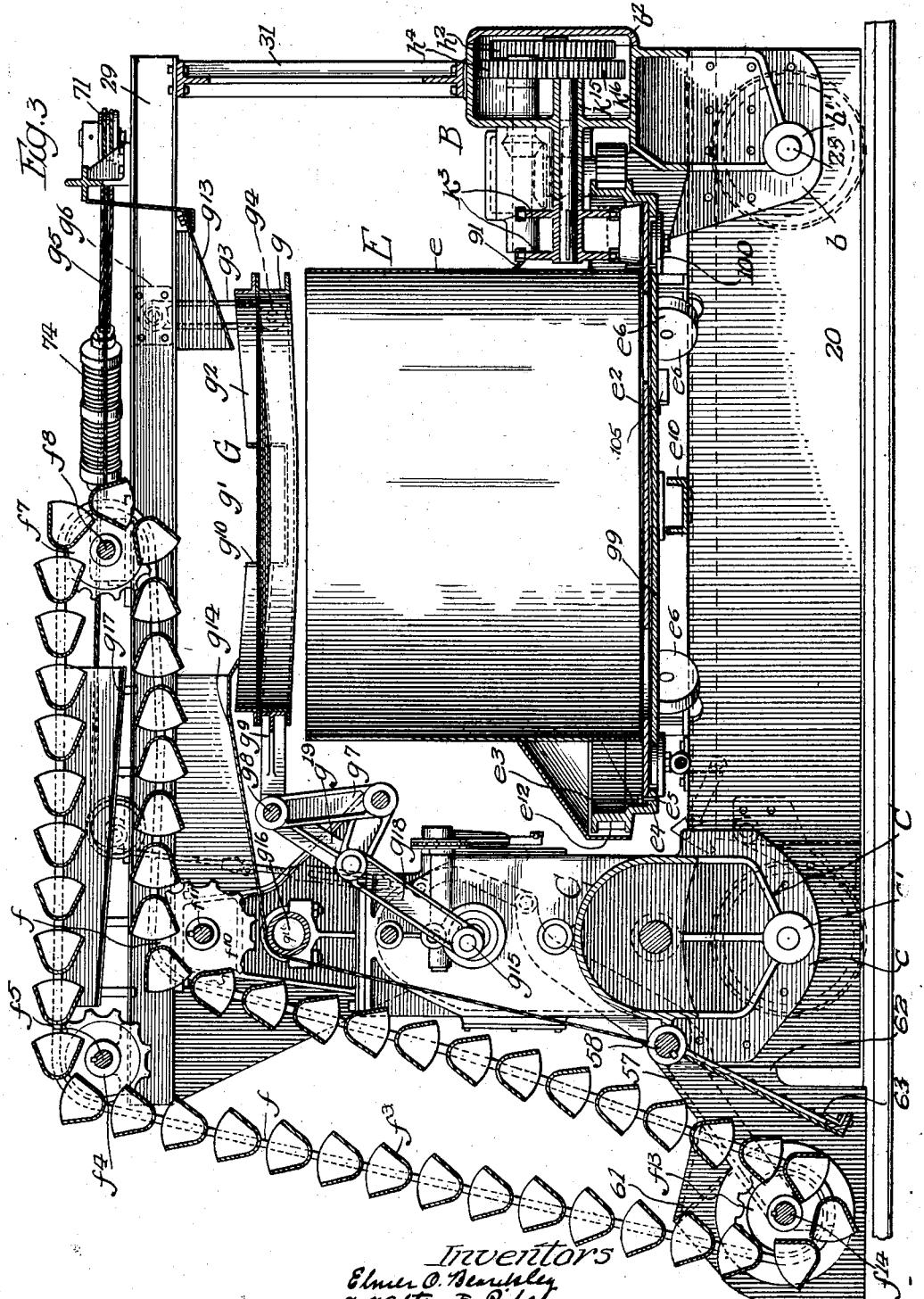
Figure 4:
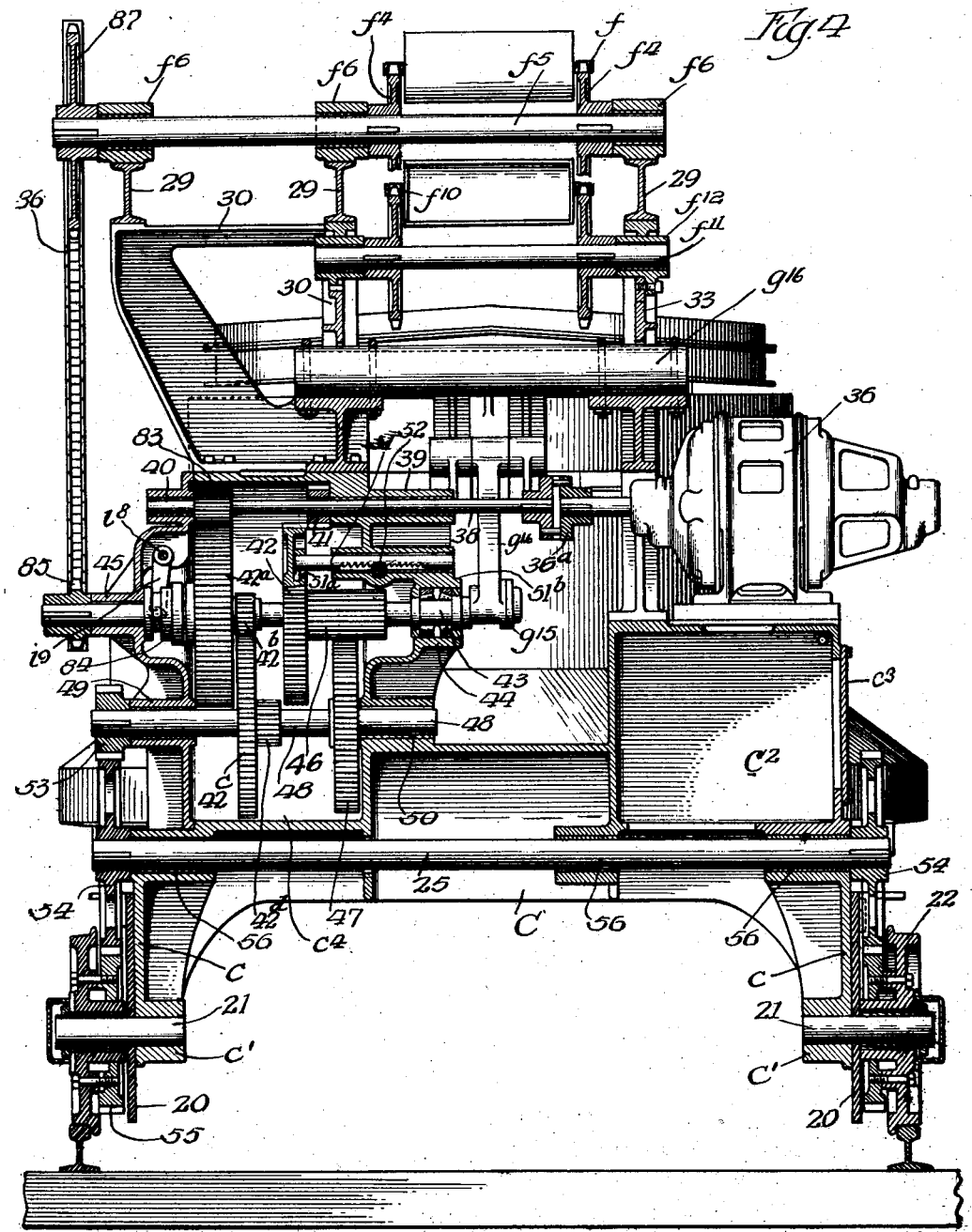
Figure 5:
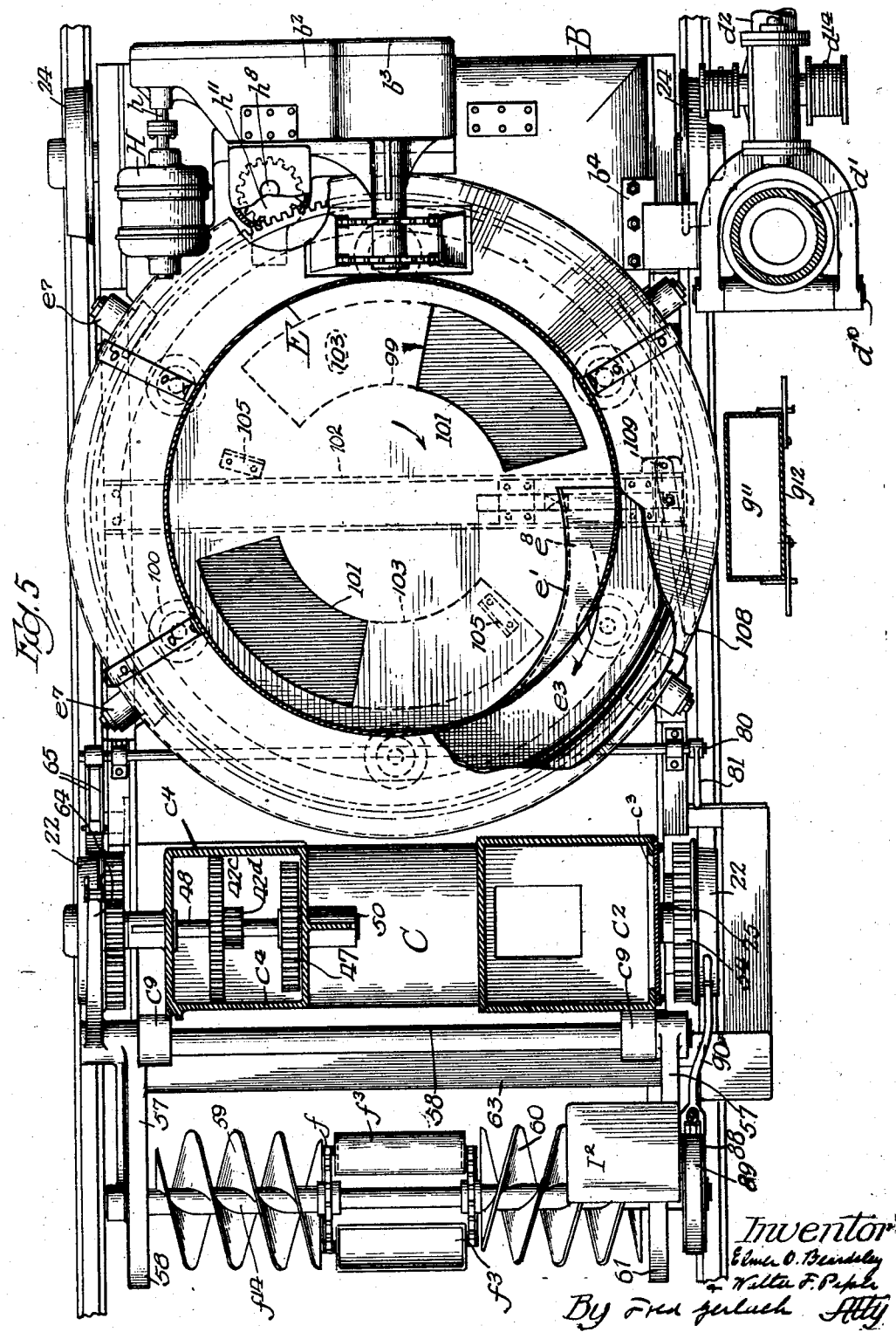
Figure 6:
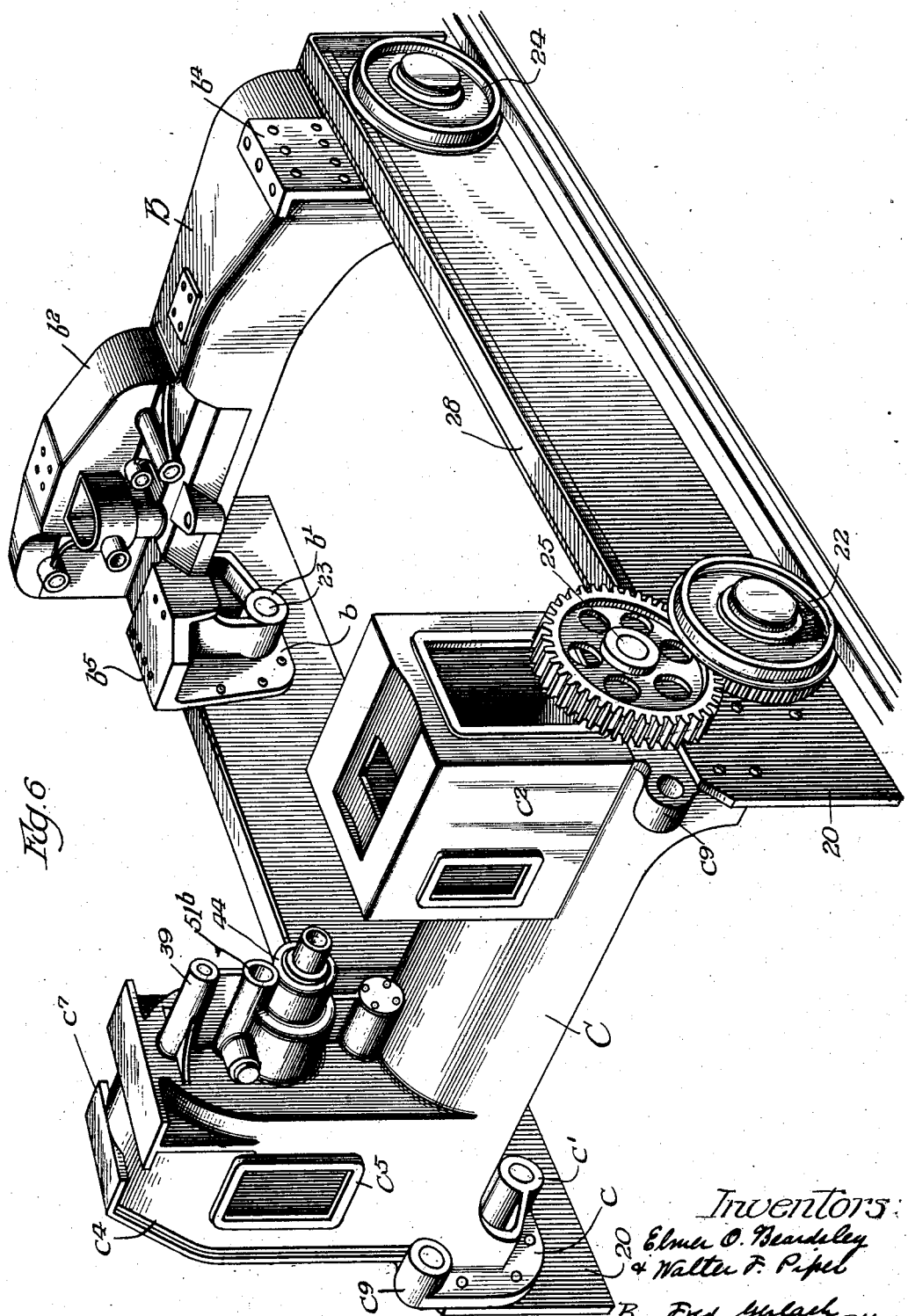
Figure 7:
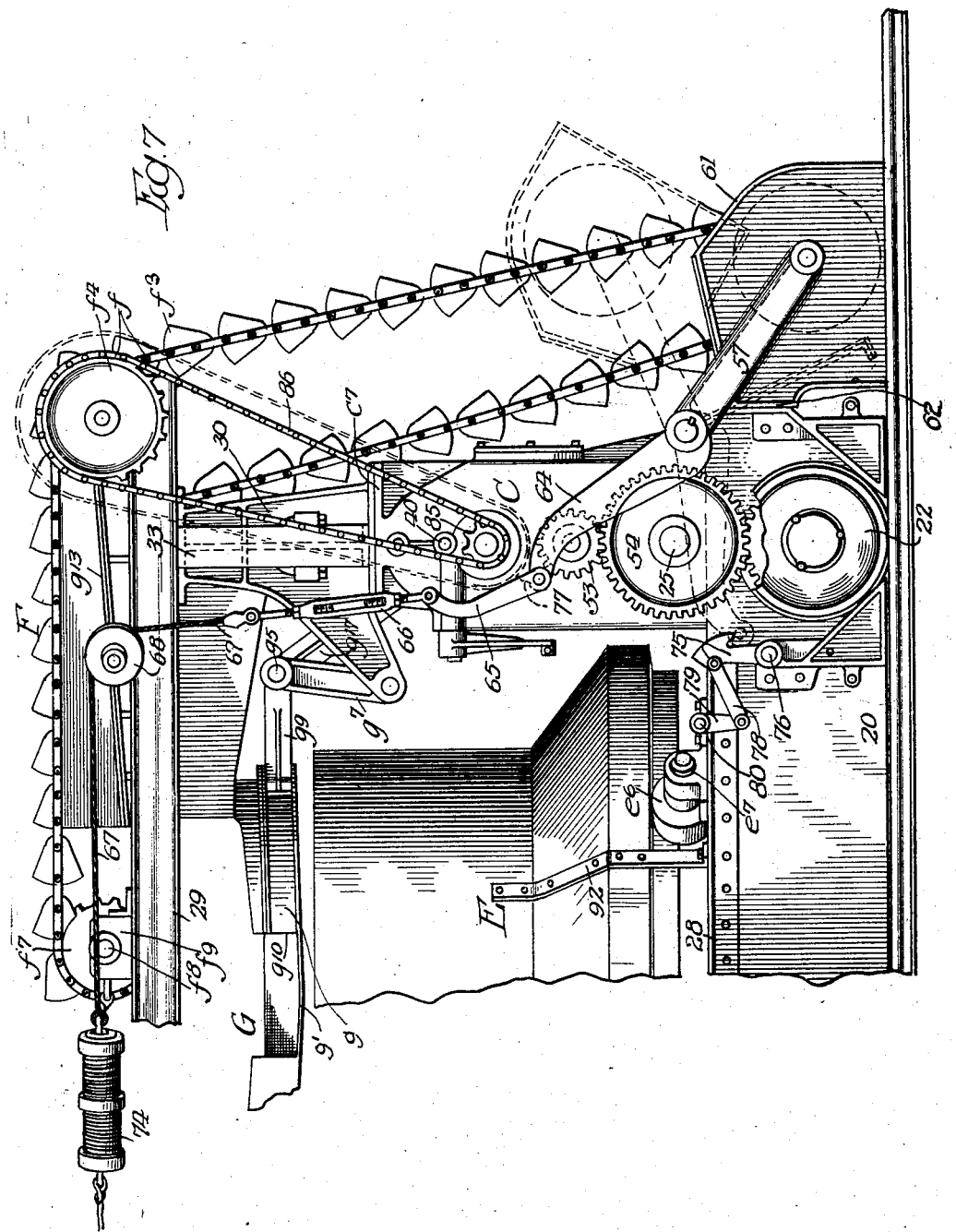
Figure 8:
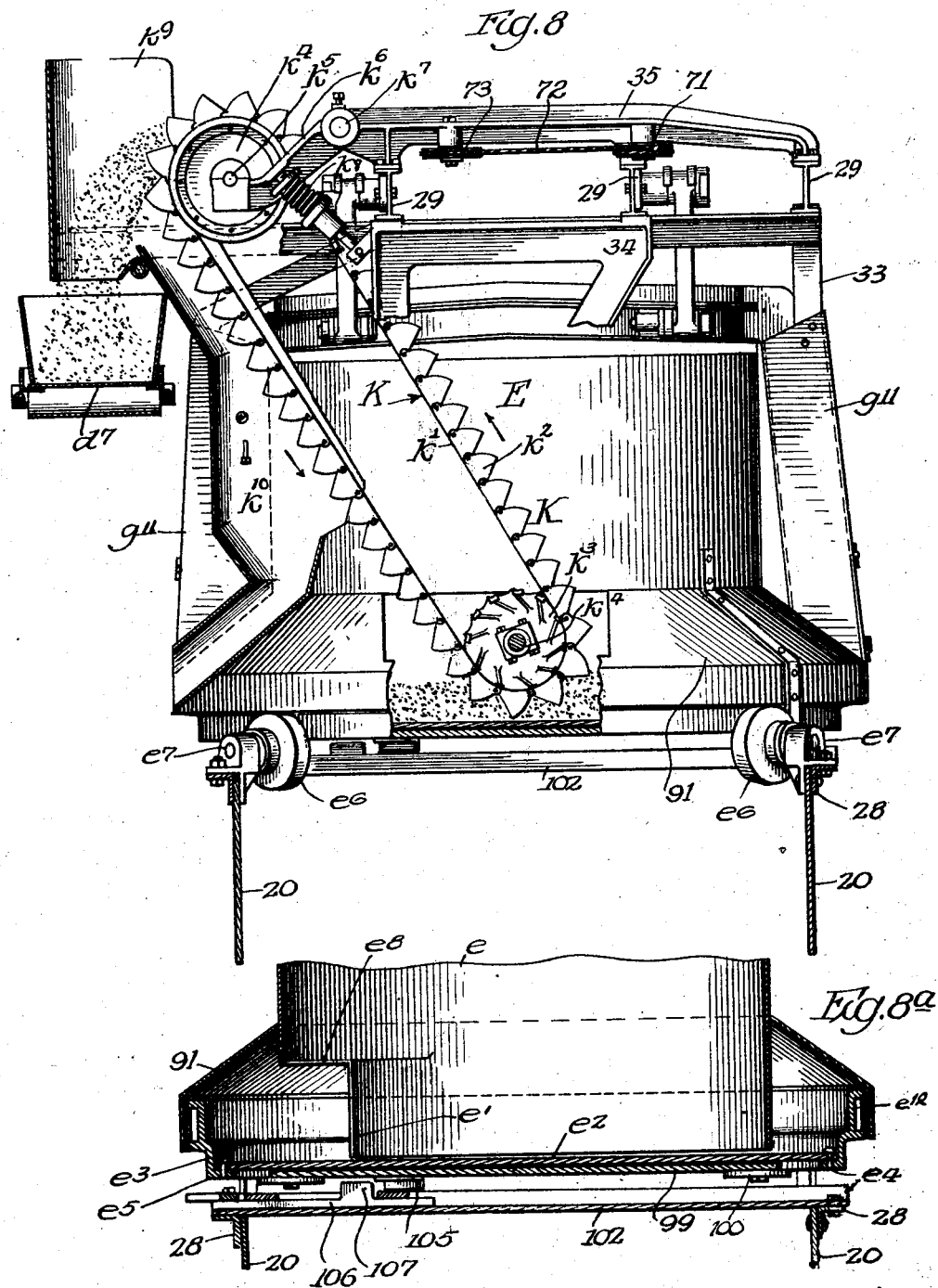
Figure 9:
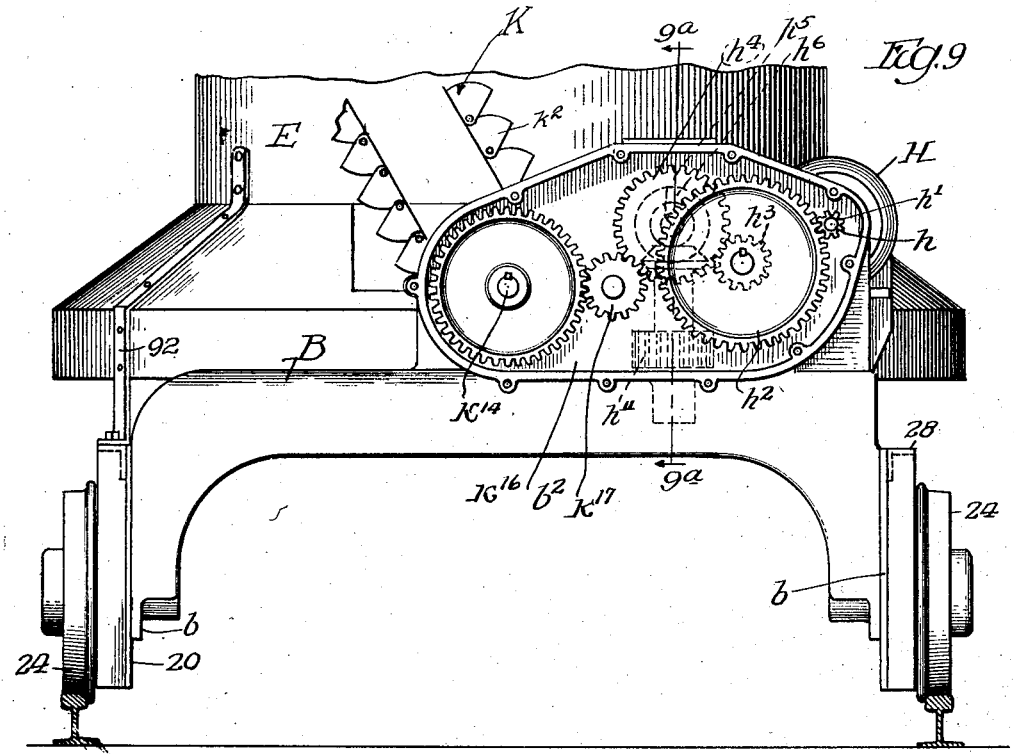
Figure 9A:
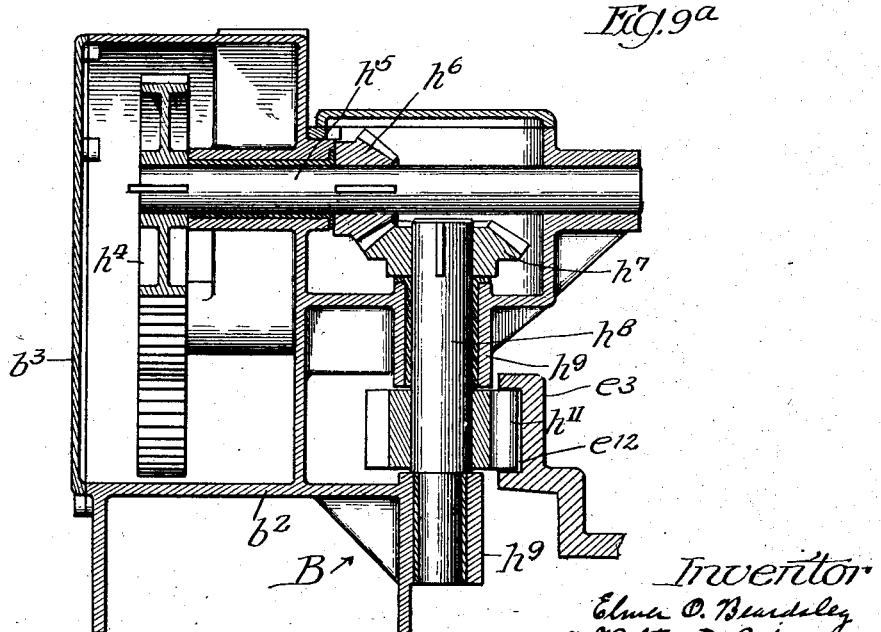

In the drawings: Fig. 1 is a side elevation of a machine embodying the invention. Fig. 1ª is an elevation, showing the controlling devices for the truck-propelling gearing and the gearing for driving the loading mechanism. Fig. 2 is a plan. Fig. 3 is a central vertical longitudinal section. Fig. 4 is a transverse section on line 4—4 of Fig. 1. Fig. 5 is a horizontal section on line 5—5 of Fig. 1. Fig. 6 is a perspective of the frame-structure of the truck. Fig. 7 is a side elevation of a portion of the machine. Fig. 8 is a section showing the elevator for delivering sand from the reservoir to the feed-mechanism for the projector. Fig. 8ª is a transverse section through the bottom of the sand-reservoir. Fig. 9 is an end elevation, showing the gearing for rotating and driving the reservoir and for driving said elevator. Fig. 9ª is a section on line 9ª—9ª of Fig. 9.

The invention is exemplified in a structure in which the molding machine, a sand reservoir, an elevator for delivering sand from the reservoir to said machine, and loading mechanism are mounted on a wheeled truck adapted to run on rails on a foundry floor, so that it may be transported as an entity. The truck or carriage is composed of steel plates 20 (Fig. 6) which form the sides of the truck-frame, a casting B which extends across the front of the truck and forms a rigid cross-member or beam therefor, and a casting C which extends across the rear of the truck and also forms a rigid cross-member or beam therefor. At either side, the casting B is provided with a flange $b$, which is securely bolted to one of the plates 20. The cross-member C is provided at either end with an integral flange $c$ which fits against the inner face of, and is rigidly bolted to, one of the plates 20. Cross-member C is formed with integral sockets $c'$ (Fig. 4), in which are fixed respectively stub-axles 21 which extend outwardly through plates 20. A traction-wheel 22 is suitably journalled on the outer end of each of the stub-axles 21 to support the rear of the truck. Sockets $b'$ (Fig. 6) are integrally formed with cross-member B to support stub-axles 23 which project through the frame-plates respectively, and carrying wheels 24 are suitably journalled on the outer ends of said stub-axles to support the front of the truck. An angle iron reinforcing bar 28 is secured to the margin of each of the plates 20. Cross-member C has integrally formed therewith a box or housing $c^2$ (Figs. 4 and 5), which is utilized to support the electric motor for driving the loading conveyor and the truck-propelling mechanism, and to contain electrical controlling appliances (not shown) for the motor. The outer side of housing $c^2$ is provided with a removable plate $c^3$ to provide access to said appliances when desired. This exemplifies a housing for the electric appliances which is integrally formed with one of the cross-members of the truck. Another housing $c^4$ (Figs. 4, 5 and 6) is integrally formed with cross-member C at the other side thereof to provide a housing for containing the variable speed transmission gearing for propelling the truck and the gearing for driving the loading elevator. The rear wall of housing $c^4$ is provided with an opening $c^5$, which is closed by a removable plate $c^6$ (Fig. 2), so that access may be had to the gearing in the housing when desired. This housing is adapted to contain lubricant for the gearing contained therein. Cross-member C extends and is arched over the cross-shaft 25 (Fig. 4) of the propelling gearing to form a hood which will keep sand away from said shaft. Cross-member B has integrally formed therewith a housing $b^2$ for the gearing for driving the sand feeding elevator and the reservoir. This housing is adapted to contain lubricant and is provided with a removable front plate $b^3$ to provide access to the gearing therein. A bracket $b^4$ (Figs. 1 and 6) is also integrally formed with cross-member B to provide means for attaching the supporting standard for the sand-projector and also with an integral bracket $b^5$ which serves as a support for the motor for driving the gearing in housing $b^2$. Brackets $c^7$ are integrally formed with cross-member C on top of housing $c^4$, to sustain brackets which support the upper structure of the truck. Elevated I-beams 29 are supported to carry the upper portion of the loading elevator, the riddle and the upper portion of the sand-elevator. The ends of two of the I-beams are supported at one side of the truck by a bracket 30 (Fig. 4) which is bolted to the brackets $c^7$ of cross-member C, and the rear end of the other beam 29 is supported by a bracket 33 which is bolted to the top of the housing $c^2$ of cross-member C. The front ends of two of said beams are supported by a bracket 34 which is bolted at its lower end to the top of cross-member B. The front ends of said beams are also rigidly secured together by a laterally extending bracket 35 which has depending lugs bolted to all of the beams 29 (Fig. 8).

An electric motor 36 (Figs. 2 and 4) is mounted on top of housing $c^2$ of cross-member C to furnish power for propelling the truck through variable-speed transmission gearing and for driving the loading elevator. The shaft of said motor is connected by a coupling $36^a$ to a transverse shaft 38 which is journalled in bearings 39 and 40 in the side walls of housing $c^4$. Shaft 38 has secured thereto high speed pinion 41 and a low speed pinion 83. The high speed gearing comprises a gear 42, which is slidably mounted on a transverse shaft 43, which is journalled in bearings 44 and 45 in the side walls of housing $c^4$ and has rigidly fixed thereto a pinion 46, and a gear 47, keyed to a cross-shaft 48, which is mounted in bearings 49 and 50 in the side walls of housing $c^4$. The low speed gearing, operable by pinion 83, comprises a gear $42^a$ which meshes constantly with said pinion and is loosely mounted on shaft 43, a pinion $42^b$ rigid with gear $42^a$, a gear $42^c$ meshing with pinion $42^b$ and loosely mounted on shaft 48, and a pinion $42^d$ rigid with gear $42^c$ and adapted to be driven by the gear 42 when the latter is shifted into one of its positions. A pinion 53, keyed to the outer end of shaft 50, meshes with a gear 54 which is keyed to the cross-shaft 25 under the cross-member C. A similar gear 54 is keyed to the opposite end of shaft 25, and these gears mesh respectively with gears 55 which are bolted to the traction-wheels 22 respectively. Shaft 25 is mounted in bearings 56 in the cross-member C.

A crank $36^a$ is rotatable on a controller box $36^b$ which is attached to the rear side of the housing $c^2$ (Fig. 1) to control motor 36. Motor 36 is of the reversible type, so that it may be operated in opposite directions to correspondingly propel the truck. When the motor is to be propelled at low speed, gear 42 is disengaged from pinion 41 and shifted into engagement with pinion $42^d$, so that shaft 48 will be driven through pinion 83, gear $42^a$, pinion $42^b$, gear $42^c$, pinion $42^d$, gear 42, pinion 45 and gear 47. When the truck is to be propelled at high speed, gear 42 will be shifted into engagement with pinion 41 on shaft 38, so that shaft 48 will be driven through pinion 41, gear 42, pinion 45 and gear 47. Gear 42 is shiftable axially, when stationary or rotating, by a rack 51 which is slidable in a bearing $51^b$ and is provided with a stud $51^a$ extending into an annular groove in the hub of said gear, and a pinion 52 which is adapted to shift said rack. The transmission is controlled by a sprocket-wheel $i'$, which is fixed to rotate pinion 52, a chain $i^2$, a sprocket $i^3$ and a hand-wheel $i^4$ which is fixed to sprocket $i^3$. Hand wheel $i^4$ is adapted to be controlled by an operator on a platform I which is fixed to one of the frame-plates 20 (Fig. 1$^a$). An auxiliary platform I$^2$, adjacent the controller-box $36^b$, is formed on one of the arms 57, and a step I' is provided for the convenience of the operator. This mechanism exemplifies reversible variable speed transmission gearing for propelling the truck.

A flask-filling machine D (Fig. 1) of the projector type is mounted on the truck and comprises a standard $d$ which is fixed to the bracket $b^4$ which is integrally formed with the cross-member B of the truck; a socket $d'$ which is mounted to swing horizontally on the standard $d$; a jib which is pivoted to said socket to swing horizontally, and comprises members $d^2$, $d^3$; an arm $d^4$, pivoted to swing horizontally on the outer end of jib-member $d^3$; a rotary sand projector $d^5$, adapted to sling wads of sand at high speed into subjacent flasks and mounted at the outer end of arm $d^4$; a motor $d^6$, mounted on said arm, and for driving the projector; an endless conveyor belt $d^7$, which is mounted to swing horizontally with the arm $d^4$, and to deliver sand to the projector; and an endless conveyor $d^9$ which is mounted to move laterally with the jib. The jib is vertically adjustable to bodily raise and lower the projector, member $d^2$ being pivoted at $d^{10}$ to the socket $d'$, and member $d^3$ being pivoted at $d^{11}$ to the member $d^2$, and controlled by a rod-connection $d^{12}$ for that purpose. Conveyor $d^9$ is mounted to swing vertically under the control of jib-member $d^4$. A motor $d^{13}$ on jib member $d^2$ is connected to operate, through suitable gearing, the raising and lowering cable $d^{14}$. A motor and gearing in a housing $d^{15}$ drives conveyor $d^7$. The construction of this molding machine is more fully illustrated and described in an application filed by us February 13, 1926, Serial Number 88,014 now Patent No. 1,717,652, to which reference may be had for a more detailed description. This exemplifies a molding machine of the sand-projector type which is mounted on the truck so it can be moved from place to place to fill flasks on the molding room floor, and is adapted to receive sand from a supply on the truck.

A tank or reservoir E is carried by the truck and is adapted to contain a load of sand in sufficient quantity to fill a large number of flasks. The sand fed to the projector is received from this reservoir. Mechanism F on the truck, for quickly loading and filling the reservoir from a storage pile in, or adjacent, the foundry, comprises an elevator which consists of a pair of endless chains $f$, equipped between them with buckets $f^3$. These chains pass around a pair of drive sprockets $f^4$ (Figs. 3 and 4) on a cross-shaft $f^5$ journalled in bearings $f^6$ fixed to I-beams 29. Chains $f$ comprise a vertical loop to raise the sand and a horizontal loop, extending forwardly from sprockets $f^4$, so the buckets will discharge sand over reservoir E. Chains $f$ pass around idler-sprockets $f^7$ which are fixed to a cross-shaft $f^8$ journalled in bearing-brackets $f^9$ which are longitudinally slidable on two of the I-beams 29. From sprockets $f^7$, the lower reaches of chains $f$ pass rearwardly around idler-sprockets $f^{10}$ which are carried by a cross-shaft $f^{11}$, which is mounted in bearings $f^{12}$, which are carried by brackets 30 and 33. From idlers $f^{10}$, chains $f$ pass downwardly around a pair of sprockets $f^{13}$ which are fixed to drive a cross-shaft $f^{14}$, which is journalled in arms 57, and thence upwardly to drive-sprockets $f^4$. Said arms are fixed to a rock-shaft 58 (Figs. 2 and 3), which is pivoted in lugs $c^9$ which are integrally formed with the cross beam C. Conveyor screws 59 and 60 on shaft $f^{14}$ convey the sand laterally to the elevator buckets $f'$. Arms 57 support the cross-conveyor and the lower portion of the elevator. Sides 61, integral with arms 57, direct the sand to cross-conveyors 59 and 60, and have abutments 62 which engage the sides of the truck-frame, to limit the drop of the cross-conveyor and arms. A plate 63 extends transversely between sides 61 to confine the sand from passing forwardly under the truck. Arms 57 and sides 61 may be swung into elevated position (dotted lines Fig. 7), so that the cross-conveyor and the elevator will be supported above the molding room floor to clear a pile of sand or flasks on the floor while the elevator is idle and the truck is being transported from place to place.

When the arms 57 and cross-conveyor are raised, the slack in the elevator chains $f$ will be automatically taken up by shifting the shaft $f^8$, which carries the idler sprockets $f^7$, and is mounted in slidable brackets $f^9$. Mechanism for this purpose comprises an arm 64 (Fig. 7) which is integral with one of the arms 57 and rigid with shaft 58, so it will swing therewith, a link 65 pivoted to arm 64, a turn-buckle 66, a cable 67, which is guided in a sheave 68, which is mounted on a beam 29, a branch 70 of cable 67, guided by a sheave 71, which is mounted in cross-bar 35 and connected to one of the sliding bearings $f^9$, another branch 72 of cable 67, which is guided by sheave 71 and a sheave 73, which is also mounted in cross-bar 35 and connected to the other bearing $f^9$, and a spring tension coupling 74 in cable 67. When the arms 57 are raised (dotted lines Fig. 7), arm 64 will swing downwardly to operate these cable connections, so they will shift forwardly the bearings $f^9$, shaft $f^8$ and sprockets $f^7$ which carry the front end of the chains $f$, to keep the chains taut. Stops $67^a$ limit the rearward movement of bearings $f^9$. The shift of these bearings is yieldingly effected through the spring-couplings 74, so that the take-up mechanism will keep the chains taut without undue tension on the chains. A latch 75 (Fig. 7), pivoted as at 76, is adapted to engage a tooth 77 on the arm 64 to lock the arms 57 and cross-conveyor in raised position and to correspondingly hold these take-up connections. Latch 75 is controlled by a pair of links 78 which are pivoted to said latch and to an arm 79 on a cross-shaft 80 (Fig. 2) which is provided with a handle 81 by which it may be manipulated by the operator on the platform I, to lock or release the loading mechanism. Driving mechanism for the loading elevator, operable by motor 36, comprises a clutch 84 (Fig. 4), adapted to be coupled to gear $42^a$ to drive shaft 43, a sprocket-wheel 85, fixed to the outer end of shaft 43, sprocket-chain 86, driven by sprocket 85, and a sprocket-wheel 87, which is fixed to drive-shaft $f^5$, to which the drivesprockets $f^4$ are keyed. Clutch 84 is controllable by the operator on the platform I through a rod $i^6$ (Fig. 1a), which is connected to an arm $i^7$, a shaft $i^8$, fixed to said arm, and extended into the housing $c^4$, and a clutch-shafting arm $i^9$ fixed to the inner end of said shaft.

The raising of the cross-conveyor and arms 57 and the lower portion of the elevator is effected by power derived from the chains $f$ under control of a brake drum 88 fixed to the cross-conveyor shaft $f^{14}$, a brake-band 89, adapted to be applied to said drum, and a hand-lever 90, pivoted to one of the sides 61, and connected to the brake band, so it may be tightened to lock the drum against rotation when the lever is shifted in one direction. To raise the conveyor, the operator will shift lever 90 to lock the brake-drum, whereupon the sprockets $f^4$ will, through chains $f$, lift the cross-conveyor shaft, in lieu of rotating it. Simultaneously, arm 64 will be rocked to operate the take-up mechanism until arm 64 is locked by latch 75. To lower the cross-conveyor and elevator, the operator will release the latch 75 and apply sufficient frictional retardation to the brake-drum 88 through lever 90 and brake-band 89, to permit the cross-conveyor to gradually drop into operative position. This exemplifies power-operated raising mechanism for the cross-conveyor and the elevator.

The loading elevator delivers the sand to a riddle G to condition or disintegrate the sand for delivery to the molding machine as it is delivered to the reservoir E. This riddle comprises a channelled ring $g$, a perforated screen $g'$ and angle iron members $g^2$ which secure the screen to ring $g$. At its front, the ring $g$ is suspended by pendant links $g^3$ which are pivoted to the ring at $g^4$ and to brackets $g^6$ fixed to beams 29. At the rear, the riddle is supported by a vertically extending link or arm $g^7$, which is pivoted at $g^5$ to a bracket $g^9$ fixed to ring $g$. The screen $g'$ is sloped, so that the disintegrated sand will drop through it into the reservoir E and to discharge the lumps retained thereby through spouts $g^{10}$ into chutes $g^{11}$ which are each provided with a door $g^{12}$, so that the screenings can be removed. An inclined chute $g^{17}$, under the upper reach of the buckets $f^3$, directs the sand into the riddle. An inclined chute $g^{13}$ is supported forwardly of the horizontal loop of the elevator chain to direct overthrown sand from the bucket $f^3$ into the riddle. A sheet metal plate $g^{14}$ extends under the lower reach of the horizontal loop of the elevator and in front of the front reach of the vertical loop, to direct any sand falling from the buckets rearwardly of the riddle back to where it will be again caught by the elevator. This plate extends over a tubular strut or cross-member $g^{16}$ which is secured by U-bolts to brackets 30, 33.

Mechanism for vibrating the riddle while the elevator is in operation, consists of a wrist-pin $g^{15}$ (Figs. 3 and 4) on the inner end of shaft 43, and a link $g^{18}$ between said wrist-pin and extensions $g^{19}$ which are integral with link $g^7$. When the clutch 82 is coupled to drive the loading elevator, the riddle vibrating mechanism will be simultaneously operated.

The sand-reservoir E (Figs. 3, 8 and 8$^a$) comprises a stationary cylinder $e$ which is supported by straps 92, which are fixed to bars 28 of the truck-frame, and a rotatable bottom-plate $e^2$. Said plate is bolted, at $e^4$, to an underlying inwardly extending flange $e^5$ of a cast ring $e^3$ which is mounted to rotate horizontally on a series of rollers $e^6$ which are carried by brackets $e^7$ which are fixed to the truck-frame. The outer margin of plate $e^2$ and ring $e^3$ are disposed outwardly of cylinder $e$ to form an annular channel around the outside of the lower portion of the cylinder. The lower portion of the wall of the cylinder is curved inwardly, as at $e'$, (Figs. 5 and 8$^a$), and the top of this curved wall is joined to the cylinder by a horizontal top wall $e^8$. This curved wall deflects the sand resting on the plate $e^2$, under the influence of its rotation, outwardly to the channel around the outside of the cylinder $e$, from which the sand will be elevated for delivery to the molding machine. A hood 91, rigid with cylinder $e$, extends outwardly and downwardly from the cylinder to retain the sand in the channel around the cylinder.

Mechanism for rotating bottom $e^2$, to cause wall $e'$ to force the sand outwardly, comprises a motor H (Figs. 3 and 9), a shaft $h$, coupled to the shaft of said motor, and extending into the housing $b^2$ of the cross-member B; a pinion $h'$, fixed to shaft $h$; a gear $h^2$, meshing with pinion $h'$; a pinion $h^3$ fixed to rotate with gear $h^2$; a gear $h^4$, meshing with pinion $h^3$ and fixed to a shaft $h^5$, which is journalled in housing $b^2$ (Fig. 9$^a$), a bevelled pinion $h^6$ keyed to shaft $h^5$, a bevelled gear $h^7$ fixed to a vertical shaft $h^8$, which is journalled in bearings $h^9$ in housing $b^2$ and a gear $h^{11}$ which meshes with gear teeth $e^{12}$ formed on the outer periphery of the ring $e^3$.

A feed-elevator K, for delivering sand from the channel around the cylinder $e$ to the receiving chute $d^8$ of the molding machine, comprises a pair of chains $k'$ with buckets $k^2$. The lower portions of these chains pass around drive-sprockets $k^3$, and their upper portions pass around a magnetic drum $k^4$ which is carried by a shaft $k^5$ mounted in arms $k^6$ which are pivoted at $k^7$ to the bracket 35. A spring $k^8$ is applied to force the arms $k^6$ upwardly to keep the chains $k'$ taut. Buckets $k^2$ discharge sand (Fig. 8) into a chute $k^9$ which delivers it to the receiving chute $d^8$ of the molding machine. The magnetic drum $k^4$ causes the scrap to be held by the buckets until they pass away from the drum and drop into a suitable chute $k^{10}$, to separate the scrap from the sand. The lower portion of the elevator extends into the sand-channel between the ring $e^3$ and the cylinder $e$, to take sand from the channel. Sprockets $k^3$ are fixed to a shaft $k^{14}$ which is mounted in a bearing $k^{15}$ in housing $b^2$ which is driven by a gear $k^{16}$ fixed to said shaft and a pinion $k^{17}$ which meshes with gear $k^{16}$, which meshes with gear $h^4$ of the bottom-driving mechanism. The elevator K will be driven while the reservoir bottom $e^2$ is being rotated. This construction exemplifies gearing for driving said bottom and said elevator which is mounted in a housing integrally formed with one of the cross-members of the truck frame.

In some instances, it is desirable to empty the reservoir so that the sand therein may be again passed through the riddle to further condition it. For this purpose, a disk 99 is held against the underside of reservoir bottom $e^2$, its margin being supported by flanged rollers 100 which are carried by said plate. Openings 101 are formed in plate $e^2$, and disk 99 is formed with similar openings 103, which when in registry therewith, will permit the sand to drop out of the reservoir and onto the molding room floor between the truck sides. A channelled cross-bar 102 connects the truck-sides under the reservoir. Normally, that is, while the reservoir is being filled, and while the sand is being delivered to the molding machine by the elevator K, openings 101 will be closed by the disk 99. Stops 105 (Fig. 5) are fixed to the bottom of disk 99. A stop-bar 106 is slidably mounted in cross-bar 102 and provided with an abutment 107 which is shiftable into and out of the path of rotation of stops 105 to arrest the disk 99 while the bottom $e^2$ is rotating to open or close the openings 101. Bar 107 is operable by a lever 108, which is fulcrumed at 109, and adapted to move the stop-bar 106 inwardly or outwardly. This exemplifies means by which the openings in the bottom of the reservoir may be opened or closed by power.

The invention exemplifies a molding machine, in which the truck-frame is composed of side plates or bars and cross-members with integral housings; in which power-operated mechanism is provided for raising and lowering the cross-conveyor and lower end of the loading elevator; in which the elevator comprises a horizontally extending loop which is automatically taken up when the receiving end thereof is raised or lowered; in which the rotatable reservoir-bottom is extended to project beyond the wall of the reservoir to form a channel from which sand is fed to the molding machine; in which deflecting-means for the sand is rigid with the sand reservoir; in which the transmission gearing for propelling the truck is housed in one of the cross-beams of the frame; in which the gearing for driving the feed elevator and the reservoir bottom are conveniently housed in one of the cross-beams of the truck-frame; in which provision is made for quickly discharging the contents of the reservoir, so that it may be re-worked and re-delivered to the reservoir, preparatory to feeding it to the molding machine; in which the several mechanisms are compactly arranged to economize space, which is of importance in foundry practice; and in which power-operated mechanism is provided for opening and closing the bottom of the reservoir.

The invention is not to be understood as restricted to the details set forth, since these may be modified within the scope of the appended claims, without departing from the spirit and scope of the invention.

Having thus described the invention, what we claim as new and desire to secure by Letters Patent, is:

1. The combination of a truck comprising sides and cross members rigidly secured thereto, one of said members being formed of cast metal and embodying an integral housing, a machine mounted on the truck for filling flasks, a sand reservoir on the truck, mechanism for feeding sand from the reservoir to the machine, a motor on the truck, and a transmission driven by the motor for driving the truck, comprising gearing enclosed in said housing.

2. The combination of a truck comprising sides and cross members rigidly secured thereto, one of said members being formed of cast metal and embodying an integral housing, a machine mounted on the truck for filling flasks, a sand reservoir on the truck, mechanism for feeding sand from the reservoir to the machine, a motor on the truck, and driving mechanism for the feed mechanism, comprising gearing enclosed in said housing.

3. The combination of a truck comprising sides and cross members rigidly secured thereto, one of said members being formed of cast metal and embodying an integral housing, a machine mounted on the truck for filling flasks, a sand reservoir on the truck, mechanism for feeding sand from the reservoir to the machine, mechanism for loading sand into the reservoir, a motor mounted on the truck, and mechanism driven by the motor for driving the loading mechanism, comprising gearing enclosed in said housing.

4. The combination of a truck comprising sides and cross-members rigidly secured thereto, one of said members being formed of cast metal and embodying an integral housing, a machine mounted on the truck for filling flasks, a sand reservoir on the truck, mechanism for feeding sand from the reservoir to the machine, mechanism for loading sand into the reservoir, a riddle for the sand, and gearing for operating the riddle disposed in said housing.

5. The combination of a truck comprising sides and cross members rigidly secured thereto, one of said members being formed of cast metal and embodying an integral housing, a machine mounted on the truck for filling flasks, a sand reservoir on the truck, mechanism for feeding sand from the reservoir to the machine, mechanism mounted on the truck for loading sand into the reservoir, and mechanism for propelling the truck and driving the loading mechanism, comprising gearing disposed in said housing.

6. The combination of a truck comprising side plates and cross members rigidly secured thereto, one of said cross members being formed of cast metal and embodying an integral housing, a sand reservoir on the truck, a loading elevator on the truck, a motor on the truck, and mechanism driven by the motor for driving the elevator and propelling the truck, comprising gearing in said housing.

7. The combination of a truck comprising side plates and cross members rigidly secured thereto, one of said cross members being formed of cast metal and embodying an integral housing, a sand reservoir on the truck, a loading elevator on the truck, a motor on the truck, mechanism for conveying sand from the reservoir, propelling mechanism for the truck, and gearing driven by the motor for driving the conveying mechanism and disposed in said housing.

8. The combination of a truck comprising side plates and cross members rigidly secured thereto, one of said cross members being formed of cast metal and embodying an integral housing, a sand reservoir on the truck, a loading elevator on the truck, a motor on the truck, a riddle for sand delivered to said reservoir, and mechanism driven by the motor, for operating the riddle, comprising gearing disposed in the housing.

9. The combination of a truck comprising side plates and cross members rigidly secured thereto, one of said cross members being formed of cast metal and embodying an integral housing, a sand reservoir on the truck, a loading elevator on the truck, a motor on the truck, propelling mechanism for the truck, and mechanism driven by the motor for driving the elevator, comprising gearing disposed in said housing.

10. The combination of a truck having a motor mounted thereon and comprising side plates and cross members rigidly secured thereto, one of said members being formed of cast metal and embodying an integral housing adapted to contain the electrical control appliances for the motor, a machine mounted on the truck, for filling flasks, a sand reservoir on the truck, mechanism for feeding sand from the reservoir to the machine, mechanism for propelling the truck, and feeding mechanism for driving the sand feed mechanism.

11. The combination of a truck comprising side plates and cross members rigidly secured thereto, one of said members being formed of cast metal and embodying an integral housing for containing electrical appliances, a machine mounted on the truck, for filling flasks a sand reservoir on the truck, mechanism for feeding sand from the reservoir to the machine, a motor mounted on top of said housing and controlled by the electrical appliances, and propelling mechanism for the truck driven by said motor.

12. The combination with a truck comprising side plates and cross members rigidly secured thereto, one of the cross members being formed of cast metal and embodying a pair of integral housings, a machine mounted on the truck for filling flasks, a sand reservoir on the truck, mechanism for feeding sand from the reservoir to the machine, propelling mechanism for the truck comprising gearing in one of said housings, the other housing being adapted to contain electrical appliances, and mechanism for loading sand into the reservoir.

13. The combination of a truck comprising side plates and cross members rigidly secured thereto, one of which is formed of cast metal and embodying a pair of integral housings, a machine mounted on the truck for filling flasks, a sand reservoir on the truck, mechanism for feeding sand from the reservoir to the filling machine, one of said housings being adapted to contain electrical appliances, a motor mounted on the said one housing, an elevator for loading sand into the reservoir, and mechanism for propelling the truck and driving the elevator driven by the motor and comprising gearing disposed in the other housing.

14. The combination with a truck comprising side plates and cross members rigidly secured thereto, one of the cross members being formed of cast metal and embodying a pair of integral housings, a sand reservoir on the truck, mechanism for feeding sand from the reservoir, propelling mechanism for the truck comprising gearing in one of said housings, the other housing being adapted to contain electrical appliances, and mechanism for loading sand into the reservoir.

15. The combination of a truck comprising side plates and cross members rigidly secured thereto, one of the cross members being formed of cast metal and embodying a pair of integral housings, a sand reservoir on the truck, one of said housings being adapted to contain electrical appliances, a motor mounted on the latter housing, an elevator for loading sand into the reservoir, and mechanism for propelling the truck and driving the elevator driven by the motor and comprising gearing disposed in the other housing.

16. The combination of a truck, a flask filling machine mounted on the truck, a sand reservoir on the truck, mechanism for feeding sand from the reservoir to the filling machine, an electric motor on the truck, gearing driven by said motor for driving the feed mechanism, mechanism for loading sand into the reservoir, gearing for driving the loading mechanism, a transmission for propelling the truck, and a second motor connected to drive the gearing for the loading mechanism and the transmission.

17. The combination of a truck comprising side plates and a pair of cross members rigidly secured thereto, a flask filling machine mounted on the truck, a sand reservoir on the truck, mechanism for feeding sand from the reservoir to the machine, an electric motor mounted on one of the cross members, gearing driven by the motor for driving the feed mechanism, a housing on the said one cross member for the gearing, an elevator for loading sand into the reservoir, a transmission for propelling the truck, gearing for driving the elevator, a motor for driving the transmission and the gearing for driving the elevator, and a housing on the other cross member enclosing the transmission and the gearing for driving the elevator.

18. The combination of a truck, a sand reservoir on the truck, mechanism for feeding sand from the reservoir, an electric motor on the truck, gearing driven by said motor for driving the feed mechanism, mechanism for loading sand into the reservoir, gearing for driving the loading mechanism, a transmission for propelling the truck, and a second motor connected to drive the last mentioned gearing and the transmission.

19. The combination of a truck comprising side plates and cross members rigidly secured thereto, a sand reservoir on the truck, mechanism for feeding sand from the reservoir, an electric motor mounted on one of said cross members and connected to drive the feed mechanism, an elevator for loading sand into the reservoir, a transmission for propelling the truck, mechanism for driving the elevator, a housing on one of the cross members enclosing the transmission and the gearing for driving the elevator, and a motor for driving the transmission and said gearing.

20. The combination of a truck comprising side plates and a pair of cross members rigidly secured thereto, a sand reservoir on the truck, mechanism for feeding sand from the reservoir, an electric motor mounted on one of the cross members, gearing driven by the motor for driving the feed-mechanism, a housing on the said one cross member for the gearing, an elevator for loading sand into the reservoir, a transmission for propelling the truck, gearing for driving the elevator, a motor for driving the transmission and the gearing for driving the elevator, and a housing on the other cross member enclosing the transmission and the gearing for driving the elevator.

21. The combination of a truck comprising side plates and cross members rigidly secured thereto, a machine for filling flasks mounted on the truck, a sand reservoir on the truck, mechanism for feeding sand from the reservoir to the machine, mechanism for loading sand into the reservoir, carrying wheels for the truck, axles for the carrying wheels extending through said side plates and carried by said cross members, and propelling mechanism mounted on the truck.

22. The combination of a truck comprising side plates and cross members rigidly secured thereto, a sand reservoir on the truck, mechanism for loading sand into the reservoir, carrying wheels for the truck, axles for the carrying wheels extending through said side plates and carried by said cross members, and propelling mechanism mounted on the truck.

23. The combination with a truck, a flask filling machine on the truck, a sand reservoir on the truck, mechanism for feeding sand from the reservoir to the machine, a loading elevator mounted on the truck for delivering sand from a pile into the reservoir, arms for raising and lowering the lower portion of the elevator, a take up for the upper part of said elevator, means for raising said arms to lift the lower portion of the elevator, and means connected to said arms for operating the take-up.

24. The combination with a truck, a flask filling machine on the truck, a sand reservoir on the truck, mechanism for feeding sand from the reservoir to the machine, a loading elevator mounted on the truck for delivering sand from a pile into the reservoir, means for raising and lowering the lower portion of the elevator, an automatic take-up applied to the upper portion of the elevator, and power driven mechanism for operating the raising means and the take-up.

25. The combination with a truck, a sand reservoir, a loading elevator mounted on the truck for delivering sand from a pile into the reservoir, means for raising and lowering the lower portion of the elevator, an automatic take-up applied to the upper portion of the elevator, and power driven mechanism for operating the raising means and the take-up.

26. The combination with a truck, a flask filling machine on the truck, a sand reservoir on the truck, mechanism for feeding sand from the reservoir to the machine, a loading elevator mounted on the truck for delivering sand from a pile into the reservoir, comprising vertically and horizontally extending loops, power driven mechanism for driving the elevator, and means operable in conjunction with said power driven mechanism for raising and lowering the lower end of the vertical loop.

27. The combination with a truck, a flask filling machine on the truck, a sand reservoir on the truck, mechanism for feeding sand from the reservoir to the machine, a loading elevator mounted on the truck for delivering sand from a pile into the reservoir, comprising vertically and horizontally extending loops, driving mechanism for the elevator, means for raising the lower end of the vertical loop, and means for automatically taking up the horizontal loop when the vertical loop is raised.

28. The combination with a truck, a flask filling machine on the truck, a sand reservoir on the truck, mechanism for feeding sand from the reservoir to the machine, a loading elevator mounted on the truck for delivering sand from a pile into the reservoir, comprising vertically and horizontally extending loops, driving mechanism for the elevator, means for raising the lower end of the vertical loop, and means for automatically and yieldingly taking up the horizontal loop when the vertical loop is raised.

29. The combination with a truck, a sand reservoir on the truck, a loading elevator mounted on the truck for delivering sand from a pile into the reservoir, comprising vertically and horizontally extending loops, power driven mechanism for driving the elevator, and mechanism operable in conjunction with said power-driven mechanism for raising and lowering the lower end of the vertical loop.

30. The combination with a truck, a sand reservoir on the truck, a loading elevator mounted on the truck for delivering sand from a pile into the reservoir, comprising vertically and horizontally extending loops, driving mechanism for the elevator, means for raising the lower end of the vertical loop, and means for automatically taking up the horizontal loop when the vertical loop is raised.

31. The combination with a truck, a flask filling machine on the truck, a sand reservoir on the truck, mechanism for feeding sand from the reservoir to the machine, an endless loading elevator mounted on the truck for delivering sand from a pile into the reservoir, mechanism on the truck for driving the elevator, vertically movable rotatable means driven by the elevator, and means for braking said rotatable means to cause the lower end of the elevator to be raised.

32. The combination with a truck, a flask filling machine on the truck, a sand reservoir on the truck, mechanism for feeding sand from the reservoir to the machine, an endless loading elevator mounted on the truck for delivering sand from a pile into the reservoir, mechanism on the truck for driving the elevator, vertically movable rotatable means driven by the elevator, means for braking said rotatable means to cause the lower end of the elevator to be raised, and an automatic take-up for the upper end of the elevator operable when the brake means is applied.

33. The combination with a truck, a sand reservoir on the truck, and endless loading elevator mounted on the truck for delivering sand from a pile into the reservoir, mechanism on the truck for driving the elevator, vertically movable rotatable means driven by the elevator, and means for braking said rotatable means to cause the lower end of the elevator to be raised.

34. The combination with a truck, a sand reservoir on the truck, an endless loading elevator mounted on the truck for delivering sand from a pile into the reservoir, mechanism on the truck for driving the elevator, vertically movable rotatable means driven by the elevator, means for braking said rotatable means to cause the lower end of the elevator to be raised, and an automatic take-up for the upper end of said elevator operable when the brake is applied.

35. The combination with a truck, a flask filling machine mounted on the truck, a sand reservoir on the truck comprising a body and a rotatable bottom extended to project outwardly from the lower margin of the body, and mechanism for feeding sand to the filling machine, comprising an elevator positioned to take sand directly off the projecting portion of the bottom.

36. The combination with a truck, a flask filling machine mounted on the truck, a sand reservoir on the truck, comprising a body and a rotatable bottom extended to project from the lower margin of the body, an endless elevator for taking sand directly from the projecting portion of the bottom and feeding it to the filling machine, and power-driven gearing for simultaneously driving the elevator and rotating the bottom.

37. The combination with a truck, a flask filling machine mounted on the truck, a sand reservoir on the truck, comprising a body and a rotatable bottom extended to project from the margin of the body, and an upwardly extending rim to form a channel around the outside of said body, mechanism for feeding sand from said channel to the filling machine, and mechanism for rotating the bottom.

38. The combination with a truck, a flask filling machine mounted on the truck, a sand reservoir on the truck comprising a body and a rotatable bottom extended to project from the lower margin of the body, and an upwardly extending rim to form a channel around the outside of the body, an endless bucket elevator for conveying sand from said channel to the filling machine, and mechanism for rotating the bottom and driving the elevator.

39. The combination with a truck, a flask-filling machine mounted on the truck, a sand reservoir comprising a stationary body and a rotatable bottom extended to project outwardly from the lower margin of the body, a stationary sand deflector in the body to direct sand onto the projecting portion of the bottom, mechanism for feeding sand from said projecting portion to the filling machine, and mechanism for rotating the bottom and driving the feed mechanism.

40. The combination with a truck, a sand reservoir on the truck comprising a body and a rotatable bottom extended to project from the lower margin of the bottom, an upwardly extending rim operative in conjunction with the projecting portion of the bottom to form a channel around the outside of the body and mechansim for feeding sand from the channel.

41. The combination with a truck, a sand reservoir on the truck comprising a rotatable bottom extended to project from the margin of the reservoir, and an upwardly extending rim to form a channel around the outside of the reservoir, mechanism for feeding sand from said channel, and mechanism for rotating the bottom and operating the feed mechanism.

42. The combination with a truck, a sand reservoir on the truck, comprising a rotatable bottom extended to project from the margin of the reservoir, and an upwardly extending rim to form a channel around the outside of the reservoir, an endless bucket elevator for conveying sand from said channel, and mechanism for rotating the bottom and driving the elevator.

43. The combination with a truck, a flask filling machine mounted on the truck, a sand reservoir on the truck, mechanism for feeding sand from the reservoir to the filling machine, mechanism mounted on the truck for delivering sand from a pile on the floor into the reservoir, the reservoir being provided with an opening through which sand may be discharged to the floor, and means for closing said opening.

44. The combination with a truck, a machine for filling flasks mounted on the truck, a sand reservoir on the truck comprising a rotatable bottom provided with a discharge opening, mechanism for feeding sand from the reservoir to the filling machine, a loading elevator for delivering sand from a pile to the reservoir, means for closing the opening in the bottom rotatable therewith, and mechanism for rotating said bottom.

45. The combination with a truck, a machine for filling flasks mounted on the truck, a sand reservoir on the truck comprising a rotatable bottom provided with a discharge opening, mechanism for feeding sand from the reservoir to the filling machine, a loading elevator for delivering sand from a pile to the reservoir, a riddle for screening the sand between the elevator and the reservoir, means for closing the opening in the bottom rotatable therewith, and mechanism for rotating said bottom.

46. The combination with a truck, a sand reservoir mounted on the truck, mechanism mounted on the truck for delivering sand from a pile on the floor into the reservoir, a riddle through which the sand is delivered to the reservoir, the reservoir being provided with an opening through which sand may be discharged to the floor, and means for closing said opening.

47. The combination with a truck, a sand reservoir on the truck comprising a rotatable bottom provided with a discharge opening, a loading elevator for delivering sand from a pile to the reservoir, means for closing the opening in the bottom rotatable therewith, and mechanism for rotating said bottom.

48. The combination with a truck, a sand reservoir on the truck comprising a rotatable bottom provided with a discharge opening, a loading elevator for delivering sand from a pile to the reservoir, a riddle for screening the sand between the elevator and the reservoir, means for closing the opening in the bottom rotatable therewith, and mechanism for rotating said bottom.

Signed at Chicago, Illinois, this 2nd day of February, 1926.

ELMER O. BEARDSLEY.
WALTER F. PIPER.